United States Patent
Trott et al.

(10) Patent No.: US 9,884,277 B2
(45) Date of Patent: Feb. 6, 2018

(54) FLUID FILTER WITH THERMAL CONTROL AND PRESSURE BYPASS

(71) Applicant: Parker-Hannifin Corporation, Cleveland, OH (US)

(72) Inventors: John Trott, Saline, MI (US); Homayoun Sanatgar, Rancho Cucamonga, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 513 days.

(21) Appl. No.: 14/501,258

(22) Filed: Sep. 30, 2014

(65) Prior Publication Data

US 2015/0090669 A1 Apr. 2, 2015

Related U.S. Application Data

(60) Provisional application No. 61/885,546, filed on Oct. 2, 2013.

(51) Int. Cl.
| | | |
|---|---|---|
| *B01D 35/02* | (2006.01) | |
| *B01D 35/147* | (2006.01) | |
| *B01D 29/23* | (2006.01) | |
| B01D 29/60 | (2006.01) | |

(52) U.S. Cl.
CPC ......... *B01D 35/147* (2013.01); *B01D 29/232* (2013.01); *B01D 29/608* (2013.01); *B01D 2201/291* (2013.01)

(58) Field of Classification Search
None
See application file for complete search history.

(56) References Cited

U.S. PATENT DOCUMENTS

| | | | |
|---|---|---|---|
| 2,237,766 A * | 4/1941 | Pratt | B01D 35/14 |
| | | | 123/41.02 |
| 4,181,611 A | 1/1980 | Rubenstein et al. | |
| 4,388,196 A | 6/1983 | Lucia | |
| 4,783,271 A | 11/1988 | Silverwater | |
| 6,742,503 B2 * | 6/2004 | Feucht | F01M 1/02 |
| | | | 123/446 |
| 2002/0139735 A1 | 10/2002 | Stenersen et al. | |
| 2008/0056887 A1 | 3/2008 | Iannizzaro et al. | |

* cited by examiner

*Primary Examiner* — Terry K Cecil (74) *Attorney, Agent, or Firm* — Renner, Otto, Boisselle & Sklar, LLP (57) ABSTRACT

A filter assembly includes a filter media for filtering a fluid, and a valve having a fluid inlet and a fluid outlet for controlling a flow of the fluid through the filter assembly. The valve includes a thermally active element that changes shape between a first configuration and a second configuration in response to a temperature variation. When the thermally active element is in the first configuration the valve is open with the fluid inlet in fluid communication with the fluid outlet, and the thermally active element changes shape to the second configuration to close the valve. The thermally active element may move a valve poppet against a valve seat to close the valve. A pressure bypass is configured to open the valve in response to a pressure increase in the filter assembly above a threshold pressure when the thermally active element is in the second configuration.

12 Claims, 5 Drawing Sheets

FLUID FILTER WITH THERMAL CONTROL AND PRESSURE BYPASS

RELATED APPLICATIONS

This application claims the benefit of U.S. Provisional Application No. 61/885,546 filed Oct. 2, 2013, which is hereby incorporated herein by reference.

FIELD OF INVENTION

The present invention relates generally to fluid filter assemblies, and more particularly to valve assemblies that control fluid flow through such fluid filter assemblies.

BACKGROUND OF THE INVENTION

A variety of applications employ fluid filter assemblies. Such applications include, for example, hydraulic systems, fuel delivery systems, coolant systems, and engine lubrication systems. Filter assemblies may be used to filter any type of fluid, such as, for example, gasoline, diesel fuel, lubricating oil, water, coolant fluid, and others. For example, a filter assembly may filter out contamination from a coolant fluid that flows from a cooler tank and ultimately through a heat exchanger as part of a refrigeration system, air conditioning system, or other suitable cooling system as are known in the art.

Conventional fluid filter assemblies may include a filter media, such as a sheet of fibrous filter material folded to form a plurality of parallel pleats or folds. The side edges of the sheet are brought together so that the sheet has a cylindrical configuration, with the pleats of the sheet extending in the axial or longitudinal direction. The side edges of the sheet are then joined together, such as with adhesive, stitching or other means, to retain the filter material in the cylindrical form. The media can be imparted with resin, and/or an outer or inner wire mesh sheet, weave, or mesh cage for enhanced durability, if warranted or desirable. The reinforcement provided by such structures prevents the pleats from bunching, prevents media migration, and maintains media efficacy.

As the filter is used, contaminants may be build up within the filter media, which impedes or restricts the fluid flow. With the flow restricted, undesirable pressure may build up within the filter and clog the filter, which can result in damage to the system in which the filter is incorporated. Accordingly, a filter assembly may include a pressure bypass relief valve to permit fluid flow out of the filter assembly in the event of high pressures stemming from restricted fluid flow through the filter media. An indicator light or comparable device may be provided to alert a user of a need to change the filter assembly.

Coolant fluid that flows through refrigeration systems, air conditioning systems, and similar cooling systems including a heat exchanger presents particular issues with respect to fluid flow through a filter assembly. The coolant fluid may be subjected to temperature variations throughout the system. Typically, coolant fluid is maintained initially in a cooler tank. The coolant fluid is pumped through the cooling system to remove heat from the system for cooling. The heated coolant fluid next flows through a heat exchanger that is employed to remove excess heat from the coolant fluid, which is then returned as cooled fluid to the cooler tank. The coolant fluid typically may be filtered at the entrance port to the cooler tank. Accordingly, the temperature of the coolant fluid at the filter assembly is significant, but control of fluid flow through the filter assembly based on temperature has not been adequately addressed by conventional filter assemblies.

SUMMARY OF THE INVENTION

The present invention provides an enhanced filter assembly that includes a filter valve that combines control of flow through the filter assembly based on temperature in combination with pressure bypass relief. The filter assembly is particularly suitable for cooling system applications, in which coolant fluid flows through a heat exchanger prior to filtering, and therefore in which fluid temperature at the filter is particularly significant. The filter valve may include a thermally active element that changes shape in response to a temperature variation. The filter valve may operate in a cold mode in which the valve is open. If the temperature of the fluid rises above a trigger temperature, the valve operates in a hot mode by which the thermally active element changes shape to close the valve. Once in the hot mode, should a pressure in the filter assembly rise above a threshold pressure due to the restricted flow, the valve will operate in a pressure bypass mode in which the valve is open to permit fluid flow through the valve to relieve the excess pressure.

An aspect of the invention, therefore, is a filter assembly. In exemplary embodiments, the filter assembly includes a filter media for filtering a fluid, and a valve having a fluid inlet and a fluid outlet for controlling a flow of the fluid through the filter assembly. The valve includes a thermally active element that changes shape between a first configuration and a second configuration in response to a temperature variation. The thermally active element may be a thermally active wax element. When the thermally active element is in the first configuration the valve is open with the fluid inlet in fluid communication with the fluid outlet, and the thermally active element changes shape to the second configuration to close the valve to isolate the fluid inlet from the fluid outlet. A pressure bypass is configured to open the valve in response to a pressure increase in the filter assembly above a threshold pressure when the thermally active element is in the second configuration.

Another aspect of the invention is a method for controlling the flow of fluid through the filter assembly. In exemplary embodiments, the method includes the steps of: when the fluid is at a first temperature in which the thermally active element is in the first configuration, operating the valve in a cold mode in which the valve is open with the fluid inlet in fluid communication with the fluid outlet; when the fluid temperature rises to a second temperature in which the thermally active element changes shape to the second configuration, operating the valve in a hot mode to close the valve to isolate the fluid inlet from the fluid outlet; and when the valve is operating in the hot mode and the pressure in the filter assembly increases above a threshold pressure, operating the valve in a pressure bypass mode to open the valve when the thermally active element is in the second configuration. The valve operation may return to the hot mode from the pressure bypass mode when the pressure in the filter assembly falls below the threshold pressure, and further may return to the cold mode from the hot mode when the fluid temperature falls from the second temperature to the first temperature.

The filter assembly is suitable for incorporation into a refrigeration system, air conditioning system, or other suitable cooling system. The filter assembly combines a thermally responsive control of fluid flow with a pressure bypass relief. Through the capability of the filter valve to operate in the cold and hot modes, the configuration of the filter assembly particularly ensures communication of fluid of suitable cooling temperature through a cooling system to enhance the cooling efficiency. The filter assembly further protects the efficacy of the system by operating the filter valve in a pressure bypass mode to relieve undesirable excess pressure. The filter valve, therefore, provides for enhanced cooling efficiency and efficacy of operation as compared to conventional filter devices.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale.

As further detailed below, an aspect of the invention is a filter assembly that includes a filter media for filtering a fluid, and a filter valve having a fluid inlet and a fluid outlet for controlling a flow of the fluid through the filter assembly. The valve operates by providing thermal based control of the fluid flow through the filter assembly, in combination with pressure bypass relief. In exemplary embodiments, filter valve includes a thermally active element (e.g., a thermally active wax element) that changes shape between a first configuration and a second configuration in response to a temperature variation. When the thermally active element is in the first configuration, the valve is open with the fluid inlet in fluid communication with the fluid outlet to permit fluid flow through the valve. In response to an increase in temperature of the fluid to a trigger temperature or above, the thermally active element changes shape to the second configuration to close the valve to isolate the fluid inlet from the fluid outlet. A pressure bypass is configured to open the valve in response to a pressure increase in the filter assembly above a threshold pressure when the thermally active element is in the second configuration.

Figure 1:
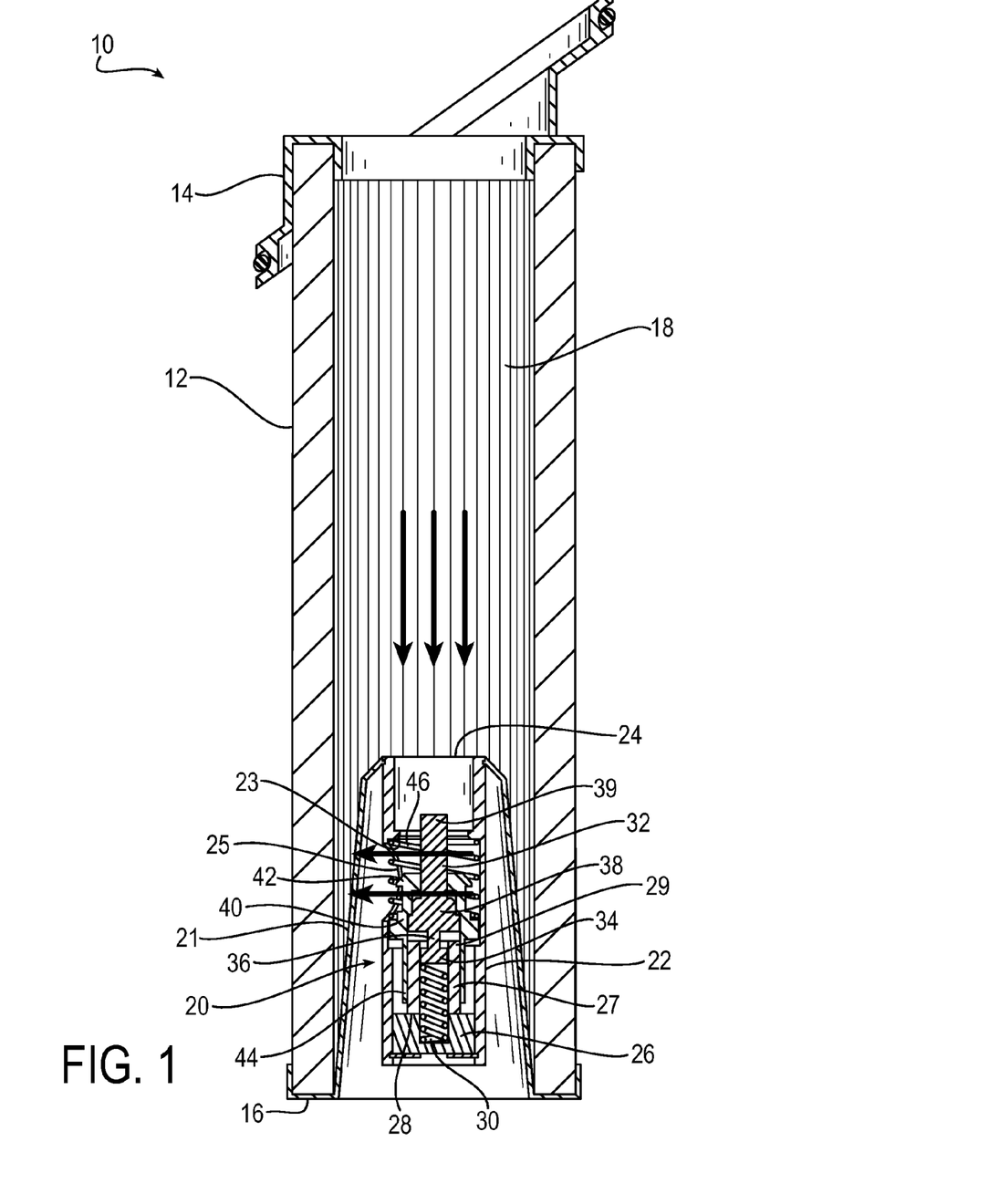
FIG. 1 is a drawing depicting a side cross-sectional view of an exemplary filter assembly in accordance with embodiments of the present invention, in a cold fluid mode.

FIG. 1 is a drawing depicting a side cross-sectional view of an exemplary filter assembly 10 in accordance with embodiments of the present invention. The filter assembly 10 may be configured as a cylindrical canister filter. The filter assembly 10, therefore, includes a filter media 12 supported between first and second end caps 14 and 16. As is conventional, the filter media 12 may be configured as a sheet of fibrous filter material folded to form a plurality of parallel pleats or folds 18. The side edges of the sheet are brought together so that the sheet has a cylindrical configuration, with the pleats of the sheet extending in the axial or longitudinal direction. As referenced above, the side edges of the sheet may be joined together by any suitable means to retain the filter material in a cylindrical form. The filter media further may be reinforced with a resin material, and/or an outer or inner wire mesh sheet, weave, or mesh cage for enhanced durability.

The filter assembly 10 further may include a filter valve 20. In the example configuration of FIG. 1, the filter valve 20 is provided adjacent one of the end caps, in this example the second end cap 16. The second end cap 16 may be formed with a recess to provide a valve support 21 that supports the valve within the filter assembly.

The filter valve 20 includes an outer valve housing 22 that encloses and houses the internal valve structures. The valve housing 22 includes extensions that protrude radially inward to form a valve seat 23. The valve housing 22 further includes an inlet port 24 and an outlet port 25 for communicating fluid flow through the filter valve 20. The valve seat 23 is located in a fluid path between the inlet port 24 and the outlet port 25.

The filter valve 20 further includes a valve base 26 that supports an inner casing 27. The inner casing 27 extends from a base end 28 to a second upper end 29. The inner casing 27 encloses a first spring 30 that is in mechanical communication with a thermally active element 32.

The thermally active element 32 is characterized in that in response to a temperature variation, the thermally active element will change its shape from a first configuration to a second configuration. In particular, there may be a trigger temperature at or above which the thermally active element will change its shape from the first configuration to the second configuration. In other words, at temperatures below the trigger temperature, the thermally active element 32 will have a shape corresponding to the first configuration. When the thermally active element 32 is heated to and above the trigger temperature, the thermally active element 32 will change shape to the second configuration. The trigger temperature depends upon the makeup or material of the thermally active element 32. Accordingly, the material of the thermally active element 32 may be selected for a corresponding trigger temperature that is suitable for a given application. In exemplary embodiments, the thermally active element 32 is a wax element made of a thermally active wax material as are known in the art.

The wax element 32 includes a first end 34, a neck 36 that extends from the first end 34, a body 38 that extends from the neck 36 from a side of the neck opposite the first end 34, and a second end 39 that extends upward from the body 38. As further explained below, in the valve state shown in FIG. 1, the first end 34 of the thermally active wax element 32 is located within the inner casing 27, with the first spring 30 biasing the position of the wax element 32 specifically with the first end 34 being located near the upper end 29 of the inner casing 27.

The filter valve 20 further includes a valve poppet 40 that is in mechanical communication with the thermally active element 32. The valve poppet 40 includes a poppet head 42 and a poppet base 44. The poppet head 42 substantially encloses the body 38 of the wax element 32. The poppet base 44 extends from the poppet head 42 so as to enclose or encircle the inner casing 27. With such configuration, the valve poppet 40 is moveable in a longitudinal direction relative to the inner casing 27, as further explained below. A second spring 46 surrounds the poppet head 42. As further explained below, in the valve state shown in FIG. 1, the valve poppet is in a retracted position in which the poppet base 44 is maximally enclosing the inner casing 27. The second spring 46 locates the poppet in position and in a floating configuration.

FIG. 1 illustrates a state of the filter valve 20 in which ordinary fluid flow is permitted through the valve. As seen in the arrows in FIG. 1, fluid flows through the inlet port 24 and out of the outlet port 25. In exemplary embodiments, the filter assembly 10 may be utilized to filter a coolant fluid in a refrigeration, air conditioning, or like cooling system in which the coolant fluid is to flow through a heat exchanger. The coolant fluid may be filtered as the coolant fluid enters a coolant fluid tank as is known in the art, or may be provided adjacent the outlet of a heat exchanger. FIG. 1, therefore, in particular represents a state in which the coolant fluid has been cooled by the heat exchanger, being filtered upon exiting the heat exchanger and returning into a coolant fluid tank. Accordingly, the valve state of FIG. 1 also is referred to as the "cold mode".

In the cold mode, the fluid being filtered is at a temperature below the trigger temperature of the thermally active wax element 32. At such temperature, the shape of the wax element 32 is in a first configuration in which the neck 36 is in a compact configuration. In such configuration, the body 38 of the wax element 32 is positioned near the first end 34 and adjacent to the second or upper end 29 of the inner casing 27. The second end 39 of the wax element 32 is positioned adjacent the valve seat 23. The bias of the first spring 30 retains the wax element 32 in such position. In addition, the bias of the second spring 46 locates the valve poppet 40 at a retracted and floating position in which the poppet head 42 is positioned remote from the valve seat 23, and the poppet base 44 essentially is fully enclosing the inner casing 27. Fluid, therefore, is free to flow through the filter valve from the inlet port 24 through the outlet port 25, as denoted by the arrows in FIG. 1.

Figure 2:
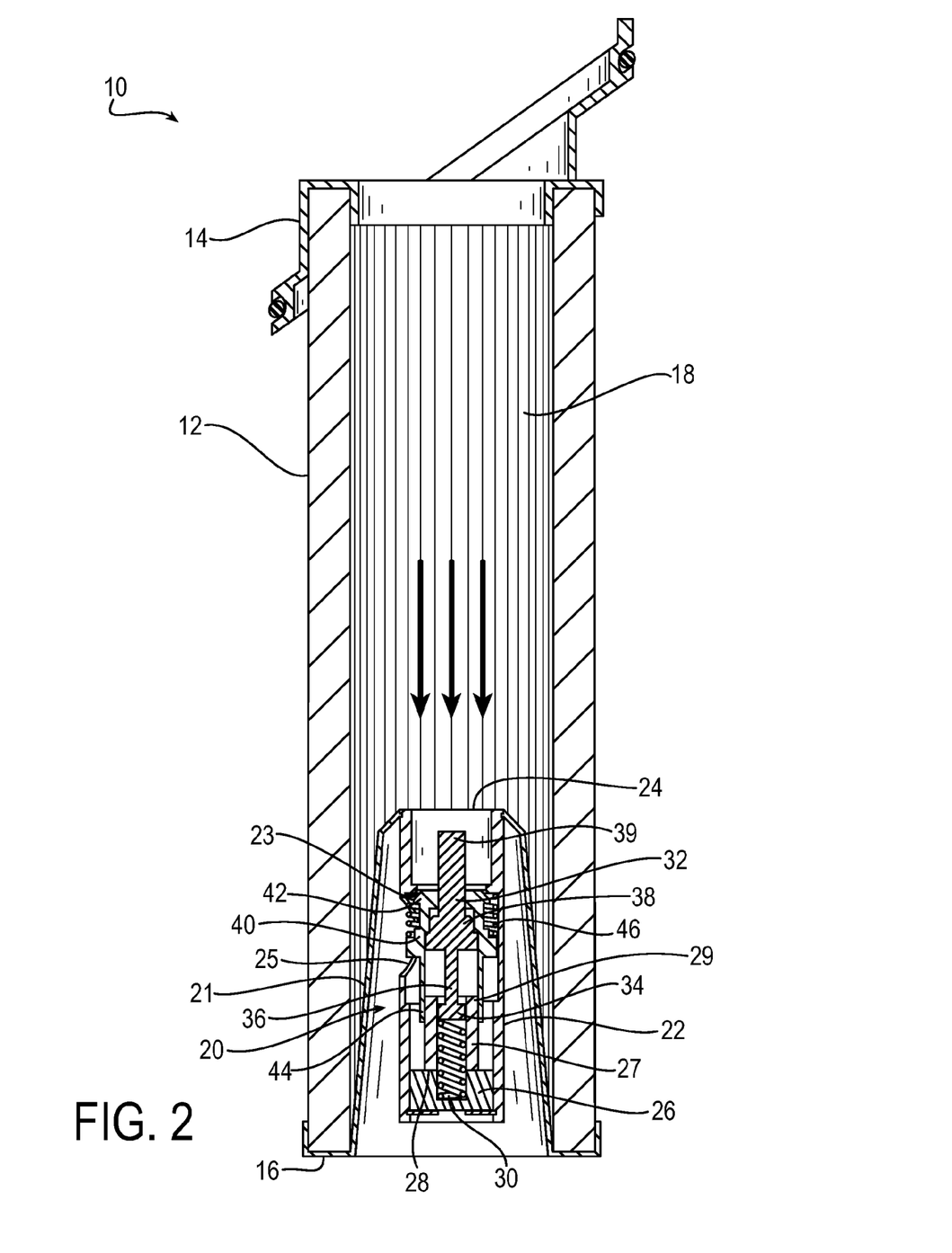
FIG. 2 is a drawing depicting a side cross-sectional view of the exemplary filter assembly of FIG. 1, in a hot fluid mode.

At times, however, a state may occur in which the coolant fluid has not been sufficiently cooled before the coolant fluid returns to the coolant fluid tank. In such a relatively hot fluid state, it is undesirable to permit the coolant fluid to flow through the cooling system as insufficient cooling would occur. Rather, it is preferable for the coolant fluid to remain in the cooling tank until such time as the coolant fluid is sufficiently cool. To restrict fluid flow when the coolant fluid is not as yet sufficiently cooled, the filter valve 20 of the filter assembly 10 may enter a second mode referred to as the "hot mode" that prevents fluid from flowing through the filter valve and therefore the filter assembly generally.

FIG. 2 is a drawing depicting a side cross-sectional view of the exemplary filter assembly 10 of FIG. 1, in the hot mode. In the hot mode, the fluid being filtered is at a temperature at or above the trigger temperature of the thermally active wax element 32. At such temperature, the shape of the wax element 32 is in a second configuration in which the neck 36 is in an extended configuration in which the body 38 of the wax element is positioned remotely from the first end 34. The second end 39 of the wax element 32 is moved through the valve housing 22 substantially above the valve seat 23. The extension of the wax element 32 in such fashion operates to move the valve poppet 40 oppositely from the retracted position of FIG. 1. In such motion, the poppet base 44 moves relative to the inner casing 27 such that the poppet base extends from the inner casing. As a result of such movement, the poppet head 42 is forced against the valve seat 23. Fluid, therefore, is restricted from flowing through the filter valve from the inlet port 24 through the outlet port 25, as denoted by the arrows in FIG. 2. In particular as seen in FIG. 2, there is no flow out of the filter valve through the outlet port 25.

In exemplary embodiments, the trigger temperature for the wax element 32 to operate in the hot mode is 60° F. For common applications, a wax element may be selected having a corresponding trigger temperature that would lie between 50°-60° F. It will be appreciated, however, that the invention is not limited to any specific trigger temperature, and any suitable wax element with an appropriate trigger temperature may be employed depending upon a specific application.

In this manner, when the thermally active element changes shape from the first configuration to the second configuration, the thermally active element moves the valve poppet against the valve seat to close the valve when the thermally active element changes shape to the second configuration. More specifically, the thermally active element moves the valve poppet head against the valve seat to close the valve when the thermally active element changes shape to the second configuration. This is achieved by the neck of the thermally active element changing from a compact configuration as seen in FIG. 1, to the extended configuration as seen in FIG. 2.

When the fluid becomes cool again to a temperature below the trigger temperature of the wax element 32, the wax element 32 will reconfigure to the first configuration in which the neck 36 is in the compact configuration. At such point, the filter valve will return to the cold mode of operation of FIG. 1, and fluid again will be free to flow through the filter valve from the inlet port 24 through the outlet port 25.

Returning to the hot mode, with the fluid flow restricted as in FIG. 2, pressure may build up undesirably within the filter assembly 10. If such pressure spikes and becomes excessive, damage to the filter assembly 10 and the broader coolant system may occur. Accordingly, the filter assembly 10 is configured such that the filter valve 20 is operable in a pressure bypass mode to prevent a pressure overload state from a pressure spike particularly when the filter valve is operating in the hot mode. Accordingly, the filter valve includes a pressure bypass mechanism configured to open the valve in response to a pressure increase in the filter assembly above a threshold pressure when the thermally active element is in the second configuration. The threshold pressure may vary depending upon the particular application incorporating the filter assembly and is determinable by one of ordinary skill in the art.

Figure 3:
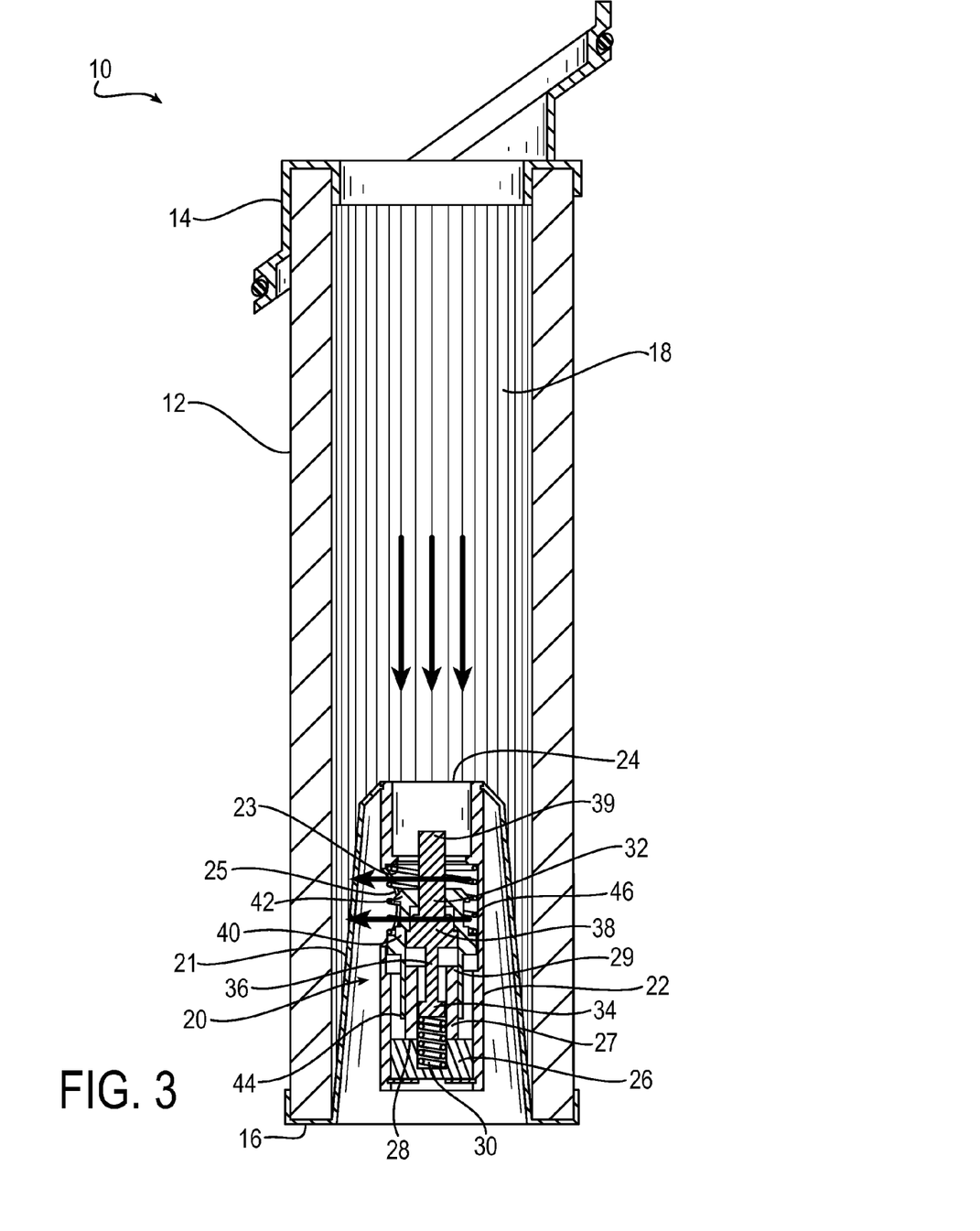
FIG. 3 is a drawing depicting a side cross-sectional view of the exemplary filter assembly of FIGS. 1 and 2, in a pressure bypass mode.

FIG. 3 is a drawing depicting a side cross-sectional view of the exemplary filter assembly of FIGS. 1 and 2, in a pressure bypass mode. Similarly to FIG. 2, the fluid is still at an elevated temperature comparably as in the hot mode. Accordingly, the wax element 32 is in the extended configuration in which the neck 36 is extended so as to position the body 38 remotely from the first end 34. In the pressure bypass mode, however, the excess pressure forces the poppet head 42 of the poppet 40 away from the valve seat 23. The force of movement of the poppet 40 in turn forces the wax element 32 to move toward the base end 28 of the inner casing 27 against the bias of the first spring 30. The pressure bypass thus includes the first spring 30 that biases the thermally active element, and a pressure above the threshold pressure compresses the first spring 30 to open the valve by moving the valve poppet away from the valve seat when the thermally active element is in the second configuration.

Comparing FIG. 1 to FIG. 3, the first spring 30 is therefore compressed in FIG. 3 under the excessive pressure relative to FIG. 1. As referenced above the movement of poppet 40 under such pressure moves the poppet head 42 away from the valve seat 23, thereby opening the valve. In essence, the valve poppet 40 is returned to its position comparably as in the cold mode of FIG. 1. The valve poppet 40 thus is at a retracted position in which the poppet head 42 is positioned remotely from the valve seat 23, and the poppet base 44 is again fully enclosing the inner casing 27. Fluid, therefore, is now free to flow through the filter valve from the inlet port 24 through the outlet port 25, as denoted by the arrows in FIG. 3. The flow of the fluid releases the excess pressure, and upon sufficient pressure release, the bias of the first spring 30 may operate on the wax element 32 to return the filter valve configuration to the hot mode configuration of FIG. 2 (and upon further cooling of the fluid to the cold mode configuration of FIG. 1).

Figure 4:
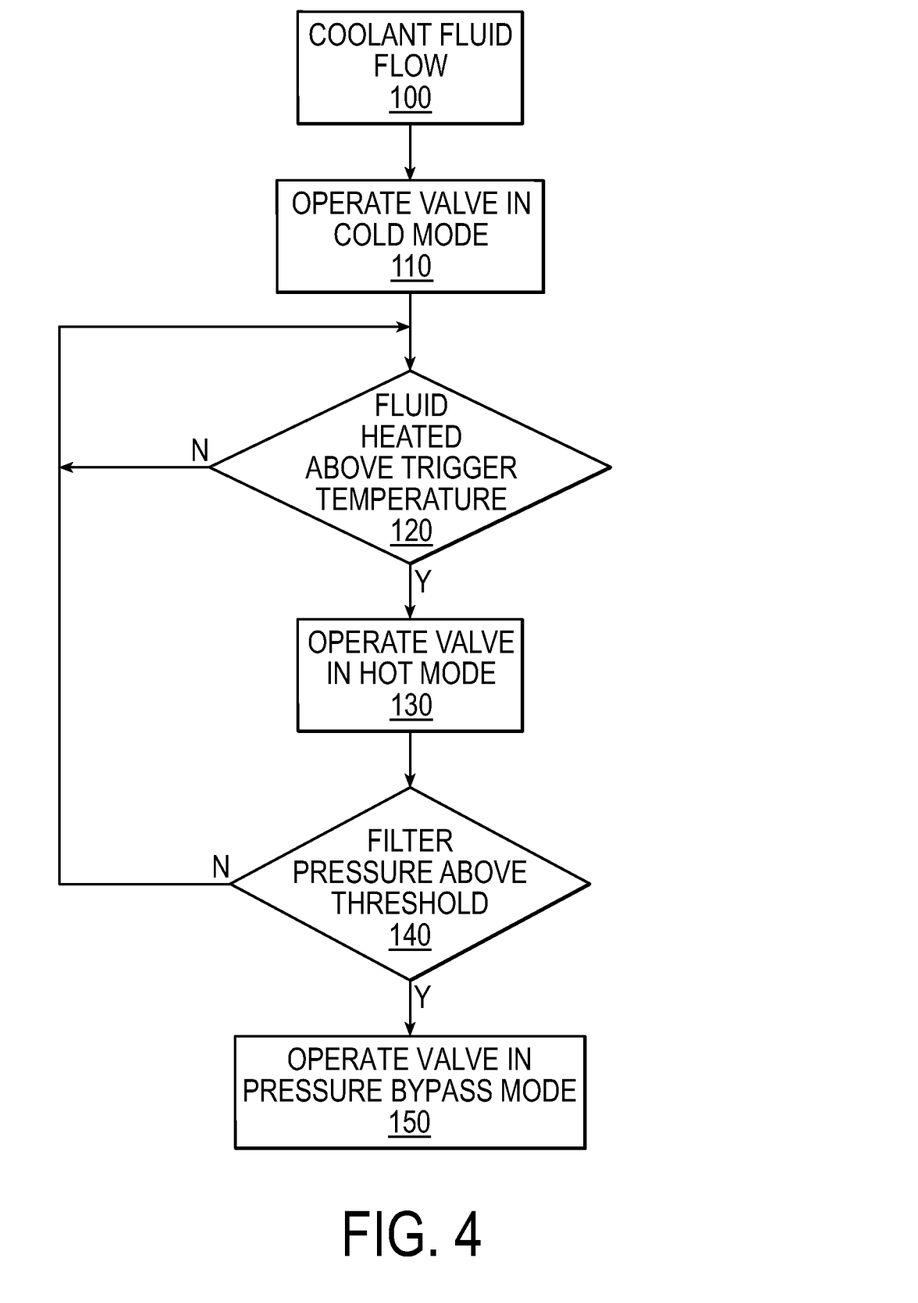
FIG. 4 is a flow chart diagram depicting an exemplary method for controlling the flow of fluid through a fluid filter assembly in accordance with embodiments of the present invention.

FIG. 4 is a flow chart diagram depicting an exemplary method for controlling the flow of fluid through a fluid filter assembly in accordance with embodiments of the present invention. The method employs a filter assembly comparable to the filter assembly 10. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method initiates at step 100 with a flow of coolant fluid through a filter assembly. At step 110, a filter valve (such as filter valve 20) may be operated in a cold mode. As described above, in the cold mode the valve is in an open condition in which the valve inlet and valve outlet are in fluid communication to permit fluid flow through the valve. At step 120, a determination is made as to whether the coolant fluid has become heated to a trigger temperature at which the thermally active element changes shape from a first configuration to a second configuration to close the valve. When the fluid is at a first temperature below the trigger temperature in which the thermally active element is in the first configuration, the method is maintained at step 110 for operating the valve in the cold mode. However, when the fluid temperature rises to a second temperature at or above the trigger temperature in which the thermally active element changes shape to the second configuration, the method proceeds to step 130 of operating the valve in a hot mode to close the valve to isolate the fluid inlet from the fluid outlet.

Pressure is then monitored at step 140 to determine whether a pressure in the filter assembly has risen above a threshold pressure. When the valve is operating in the hot mode and the pressure in the filter assembly increases above the threshold pressure, the method proceeds to step 150 of operating the valve in a pressure bypass mode to open the valve when the thermally active element is in the second configuration. This relieves the excess pressure in the filter assembly. Once the pressure falls below the threshold pressure at step 140 (or after step 150), the method returns for continued monitoring of temperature and pressure. For example, the valve operation may return to the hot mode from the pressure bypass mode when the pressure in the filter assembly falls below the threshold pressure. In addition, the valve operation may return to the cold mode from the hot mode when the coolant fluid temperature falls from the second temperature below the trigger temperature to the first temperature.

In the above manner, the filter assembly 10 of the present invention combines a thermally responsive control of fluid flow with a pressure bypass relief. Through the capability of the filter valve 20 to operate in the cold and hot modes, the configuration of the filter assembly 10 particularly ensures communication of fluid of a suitable cooling temperature through a refrigeration, air conditioning, or other cooling system to enhance the cooling efficiency. The filter assembly 10 further protects the efficacy of the cooling system by operating the filter valve 20 in a pressure bypass mode to relieve undesirable excess pressure, particularly in response to excess pressure buildup or pressure spike when the filter valve is operating in the hot mode. The filter valve 10, therefore, provides for enhanced cooling efficiency and efficacy of operation as compared to conventional filter devices.

Figure 5:
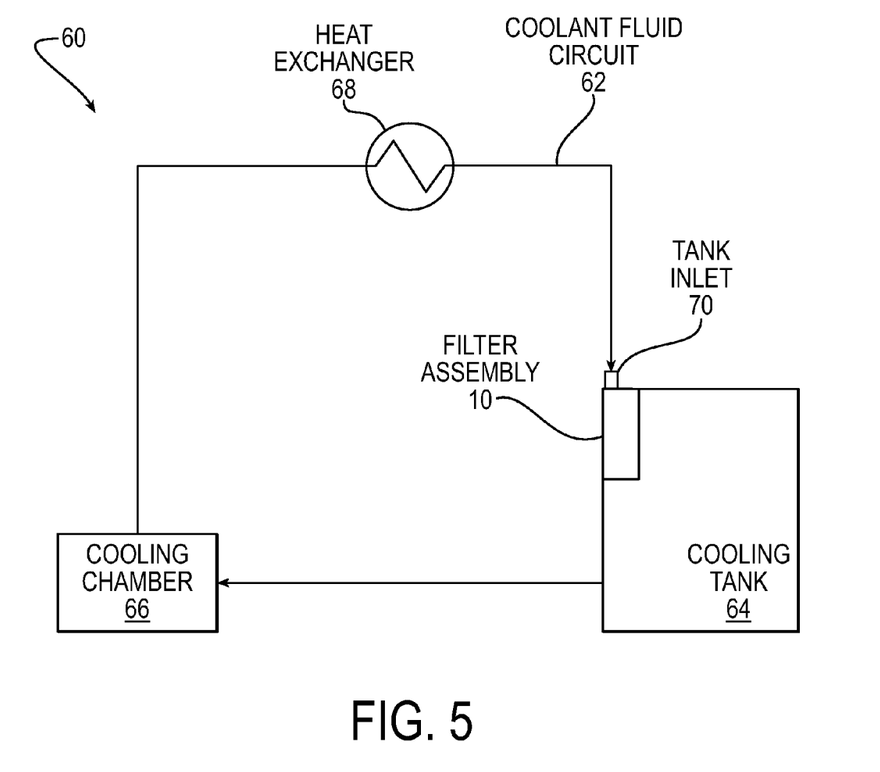
FIG. 5 is a block diagram depicting operative portions of an exemplary cooling system in accordance with embodiment of the present invention.

FIG. 5 is a block diagram depicting operative portions of an exemplary cooling system 60 in accordance with embodiments of the present invention. The cooling system 60 may be a refrigeration system, an air conditioning system, or other suitable cooling system as are known in the art. The cooling system 60 may incorporate the filter assembly 10 of the present invention.

The cooling system 60 may constitute a coolant fluid circuit 62 for communicating a coolant fluid flow for performing a cooling operation. Components of the coolant fluid circuit 62 may include a coolant tank 64 for storing a coolant fluid source in a cooled state, a cooling chamber 66 from which the coolant absorbs heat to cool the cooling chamber, a heat exchanger 68 for removing heat from heated coolant fluid to cool the coolant fluid, and a filter assembly 10 according to the various embodiments of the present invention. The cooling chamber 66 is shown as a generalized component in FIG. 5, and may vary depending upon the precise application for which cooling is required. The filter assembly typically would be located between the heat exchanger and the coolant fluid source stored within the coolant tank. In exemplary embodiments as seen in FIG. 5, the filter assembly 10 may be located at an inlet 70 of the coolant tank 64.

The direction of coolant fluid flow is shown in the arrows of FIG. 5. Coolant fluid flows from the coolant tank 64 to the cooling chamber 66, in which desired cooling operation is performed. The coolant fluid, therefore, absorbs heat as part of the cooling operation. The heated coolant fluid then flows through a heat exchanger 68, which re-cools the coolant fluid. The coolant fluid is filtered by the filter assembly 10, with the fluid flow being controlled based on temperature control and pressure bypass relief in the manner described above. The coolant fluid then flows through back into the coolant tank 64 to complete the coolant fluid circuit.

An aspect of the invention, therefore, is a filter assembly. In exemplary embodiments, the filter assembly includes a filter media for filtering a fluid, and a valve having a fluid inlet and a fluid outlet for controlling a flow of the fluid through the filter assembly. The valve includes a thermally active element that changes shape between a first configuration and a second configuration in response to a temperature variation, wherein when the thermally active element is in the first configuration the valve is open with the fluid inlet in fluid communication with the fluid outlet, and the thermally active element changes shape to the second configuration to close the valve to isolate the fluid inlet from the fluid outlet. A pressure bypass is configured to open the valve in response to a pressure increase in the filter assembly above a threshold pressure when the thermally active element is in the second configuration.

In an exemplary embodiment of the filter assembly, the thermally active element has a neck that is in a compact position in the first configuration and in an extended position in the second configuration.

In an exemplary embodiment of the filter assembly, the valve further comprises an inner casing, the thermally active element has an end that is positioned within the inner casing, and the neck of the thermally active element extends from the end through the inner casing.

In an exemplary embodiment of the filter assembly, the thermally active element is a thermally active wax element.

In an exemplary embodiment of the filter assembly, the valve further comprises a valve housing, the valve housing including a valve seat in a fluid path between the fluid inlet and the fluid outlet. A valve poppet is in mechanical communication with the thermally active element, wherein when the thermally active element changes shape from the first configuration to the second configuration, the thermally active element moves the valve poppet against the valve seat to close the valve.

In an exemplary embodiment of the filter assembly, the valve poppet has a head, the thermally active element has a body, the valve poppet head encloses the thermally active element body, and the thermally active element moves the valve poppet head against the valve seat to close the valve when the thermally active element changes shape to the second configuration.

In an exemplary embodiment of the filter assembly, the thermally active element has a neck that extends from the body, and the neck is in a compact position in the first configuration and in an extended position in the second configuration to move the valve poppet head against the valve seat to close the valve when the thermally active element changes shape to the second configuration.

In an exemplary embodiment of the filter assembly, the valve further comprises an inner casing, the thermally active element has an end that is positioned within the inner casing, and the neck of the thermally active element extends through the inner casing.

In an exemplary embodiment of the filter assembly, the valve poppet has a poppet base that extends from the poppet head and encircles the inner casing, and the valve poppet base moves relative to the inner casing when the thermally active element moves the valve poppet head against the valve seat to close the valve when the thermally active element changes shape to the second configuration.

In an exemplary embodiment of the filter assembly, the pressure bypass opens the valve in response to a pressure increase in the filter assembly above the threshold pressure by moving the valve poppet away from the valve seat when the thermally active element is in the second configuration.

In an exemplary embodiment of the filter assembly, the pressure bypass comprises a spring that biases the thermally active element, and a pressure above the threshold pressure compresses the spring to open the valve when the thermally active element is in the second configuration.

In an exemplary embodiment of the filter assembly, the pressure bypass comprises a spring that biases the thermally active element, and a pressure above the threshold pressure compresses the spring to open the valve by moving the valve poppet away from the valve seat when the thermally active element is in the second configuration.

Another aspect of the invention is a cooling system. In exemplary embodiments, the cooling system includes a coolant fluid circuit for communicating a coolant fluid flow for performing a cooling operation. The coolant fluid circuit includes a coolant tank for storing a coolant fluid source in a cooled state, a cooling chamber from which the coolant fluid absorbs heat to cool the cooling chamber, a heat exchanger for removing heat from heated coolant fluid to cool the coolant fluid, the filter assembly.

In an exemplary embodiment of the cooling system, the filter assembly is located between the heat exchanger and the coolant fluid source stored within the coolant tank.

In an exemplary embodiment of the cooling system, the filter assembly is located at an inlet of the coolant tank.

Another aspect of the invention is a method for controlling the flow of fluid through the filter assembly including the steps of: when the fluid is at a first temperature in which the thermally active element is in the first configuration, operating the valve in a cold mode in which the valve is open with the fluid inlet in fluid communication with the fluid outlet; when the fluid temperature rises to a second temperature in which the thermally active element changes shape to the second configuration, operating the valve in a hot mode to close the valve to isolate the fluid inlet from the fluid outlet; and when the valve is operating in the hot mode and a pressure in the filter assembly increases above a threshold pressure, operating the valve in a pressure bypass mode to open the valve when the thermally active element is in the second configuration.

In an exemplary embodiment of the control method, the method further includes returning to the hot mode from the pressure bypass mode when the pressure in the filter assembly falls below the threshold pressure.

In an exemplary embodiment of the control method, the method further includes returning to the cold mode from the hot mode when the fluid temperature falls from the second temperature to the first temperature.

In an exemplary embodiment of the control method, the fluid is a coolant fluid that flows through a cooling system.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A filter assembly comprising:
   a filter media for filtering a fluid; and
   a valve having a fluid inlet and a fluid outlet for controlling a flow of the fluid through the filter assembly;

the valve comprising:
a thermally active element that changes shape between a first configuration and a second configuration in response to a temperature variation, wherein when the thermally active element is in the first configuration the valve is open with the fluid inlet in fluid communication with the fluid outlet, and the thermally active element changes shape to the second configuration to close the valve to isolate the fluid inlet from the fluid outlet; and
a pressure bypass configured to open the valve in response to a pressure increase in the filter assembly above a threshold pressure when the thermally active element is in the second configuration;
wherein:
the valve further comprises a valve housing, the valve housing including a valve seat in a fluid path between the fluid inlet and the fluid outlet, and a valve poppet in mechanical communication with the thermally active element; wherein when the thermally active element changes shape from the first configuration to the second configuration, the thermally active element moves the valve poppet against the valve seat to close the valve;
the valve poppet has a head, the thermally active element has a body, the valve poppet head encloses the thermally active element body, and the thermally active element moves the valve poppet head against the valve seat to close the valve when the thermally active element changes shape to the second configuration; and
the thermally active element has a neck that extends from the body, and the neck is in a compact position in the first configuration and in an extended position in the second configuration to move the valve poppet head against the valve seat to close the valve when the thermally active element changes shape to the second configuration.

2. The filter assembly of claim 1, wherein the thermally active element has a neck that is in a compact position in the first configuration and in an extended position in the second configuration.

3. The filter assembly of claim 2, wherein:
the valve further comprises an inner casing;
the thermally active element has an end that is positioned within the inner casing; and
the neck of the thermally active element extends from the end through the inner casing.

4. The filter assembly of claim 1, wherein the thermally active element is a thermally active wax element.

5. The filter assembly of claim 1, wherein:
the valve further comprises an inner casing;
the thermally active element has an end that is positioned within the inner casing; and
the neck of the thermally active element extends through the inner casing.

6. The filter assembly of claim 5, wherein:
the valve poppet has a poppet base that extends from the poppet head and encircles the inner casing; and
the valve poppet base moves relative to the inner casing when the thermally active element moves the valve poppet head against the valve seat to close the valve when the thermally active element changes shape to the second configuration.

7. The filter assembly of claim 1, wherein the pressure bypass opens the valve in response to a pressure increase in the filter assembly above the threshold pressure by moving the valve poppet away from the valve seat when the thermally active element is in the second configuration.

8. The filter assembly of claim 7, wherein the pressure bypass comprises a spring that biases the thermally active element, and a pressure above the threshold pressure compresses the spring to open the valve by moving the valve poppet away from the valve seat when the thermally active element is in the second configuration.

9. The filter assembly of claim 1, wherein the pressure bypass comprises a spring that biases the thermally active element, and a pressure above the threshold pressure compresses the spring to open the valve when the thermally active element is in the second configuration.

10. A cooling system comprising:
a coolant fluid circuit for communicating a coolant fluid flow for performing a cooling operation, the coolant fluid circuit comprising:
a coolant tank for storing a coolant fluid source in a cooled state;
a cooling chamber from which the coolant fluid absorbs heat to cool the cooling chamber;
a heat exchanger for removing heat from heated coolant fluid to cool the coolant fluid; and
a filter assembly according to claim 1.

11. The cooling system of claim 10, wherein the filter assembly is located between the heat exchanger and the coolant fluid source stored within the coolant tank.

12. The cooling system of claim 11, wherein the filter assembly is located at an inlet of the coolant tank.

* * * * *